United States Patent
Himanen et al.

(10) Patent No.: US 7,103,349 B2
(45) Date of Patent: Sep. 5, 2006

(54) METHOD, SYSTEM AND NETWORK ENTITY FOR PROVIDING TEXT TELEPHONE ENHANCEMENT FOR VOICE, TONE AND SOUND-BASED NETWORK SERVICES

(75) Inventors: Teemu Himanen, Helsinki (FI); Pasi Ylinen, Vantaa (FI)

(73) Assignee: Nokia Corporation, Espoo (FI)

( * ) Notice: Subject to any disclaimer, the term of this patent is extended or adjusted under 35 U.S.C. 154(b) by 247 days.

(21) Appl. No.: 10/136,516

(22) Filed: May 2, 2002

(65) Prior Publication Data

US 2004/0198323 A1    Oct. 7, 2004

(51) Int. Cl.
*H04M 3/16*    (2006.01)

(52) U.S. Cl. .................. 455/412.1; 455/412.2; 455/414.2; 379/88.07; 379/88.08; 704/200; 704/208

(58) Field of Classification Search ........... 455/412.1, 455/412.2, 413, 466, 550.1, 566, 414.2; 379/93.01, 379/93.07, 93.08, 93.23, 93.24, 88.07, 88.08; 340/825.19; 704/235, 260, 200, 208; 709/206, 709/203
See application file for complete search history.

(56) References Cited

U.S. PATENT DOCUMENTS

| | | | |
|---|---|---|---|
| 5,724,410 A * | 3/1998 | Parvulescu et al. | 379/88.18 |
| 5,950,123 A * | 9/1999 | Schwelb et al. | 455/414.4 |
| 6,175,820 B1 * | 1/2001 | Dietz | 704/235 |
| 6,249,808 B1 * | 6/2001 | Seshadri | 709/206 |
| 6,310,889 B1 * | 10/2001 | Parsons et al. | 370/466 |
| 6,434,526 B1 * | 8/2002 | Cilurzo et al. | 704/270.1 |
| 6,496,693 B1 * | 12/2002 | Tran | 455/426.1 |
| 6,813,606 B1 * | 11/2004 | Ueyama et al. | 704/270.1 |
| 2001/0034225 A1 | 10/2001 | Gupte et al. | |
| 2002/0016161 A1 * | 2/2002 | Dellien et al. | 455/403 |
| 2002/0055350 A1 * | 5/2002 | Gupte et al. | 455/412 |
| 2002/0077095 A1 * | 6/2002 | Fu et al. | 455/420 |
| 2003/0083105 A1 * | 5/2003 | Gupta et al. | 455/563 |

OTHER PUBLICATIONS

3GPP TS 26.226 V5.0.0 (Mar. 2001) Technical Specification, 3rd Generation Partnership Project; Technical Specification Group Services and System Aspects; Cellular Text Telephone Modem; General Description (Release 5), pp. 1-23.

3GPP TS 22.226 V5.0.0 (Jun. 2001) Technical Specification, 3rd Generation Partnership Project; Technical Specification Group Services and System Aspects; Global Text Telephony; Stage 1 (Release 5), pp. 1-19.

(Continued)

Primary Examiner—Danh Cong Le
(74) Attorney, Agent, or Firm—Squire, Sanders & Dempsey L.L.P.

(57) ABSTRACT

The invention is a system, a method of transmitting messages selectively as text or non-text from an entity (104) in a network (100 and 102), and an entity in a network. A system in accordance with the invention includes at least one terminal (16); a network containing the at least one terminal; an entity in the network which provides messages selectively as text or non-text to the network in a speech encoded form; and wherein the messages are transmitted in the speech encoded form by the network to the at least one terminal which reproduces the messages to a user thereof in either a text form or by a sound reproduction device of the at least one terminal.

62 Claims, 3 Drawing Sheets

OTHER PUBLICATIONS

3GPP TS 23.226 V5.0.0 (Jun. 2001) Technical Specification, 3rd Generation Partnership Project; Technical Specification Group Services and System Aspects; Global Text Telephony; Stage 2 (Release 5), pp. 1-27.

3GPP TS 24.008 V5.3.0 (Mar. 2002) Technical Specification, 3rd Generation Partnership Project; Technical Specification Group Core Network; Mobile Radio Interface Layer 3 Specification; Core Network Protocols; Stage 3 (Release 5), pp. 1-20 and 209-231.

* cited by examiner

METHOD, SYSTEM AND NETWORK ENTITY FOR PROVIDING TEXT TELEPHONE ENHANCEMENT FOR VOICE, TONE AND SOUND-BASED NETWORK SERVICES

BACKGROUND OF THE INVENTION

1. Field of the Invention

The present invention relates to the providing of text-based messages originating from a network entity to network terminals using speech encoding.

2. Description of the Prior Art

Due to digital cellular phone systems being optimized for speech signals and radio transmissions thereof may be subject to relative high error rates, the known transmission of text telephone originated messages using known speech transmission techniques in cellular networks is, in some cases, unsatisfactory. The received messages have an expectedly high character error rate (CER). One reason for this is that the digital cellular phones use speech coding in order to compress the signal. Since the coding is optimized for speech-like signals, text messages using the speech path of a cellular network are subject to distortion. A further problem is transmission errors and the applied error correction in digital cellular systems in poor channel conditions. The repetition of speech frames results in character errors and error propagation. Traditional text telephone modulation technique, designed years ago for the public switched telephone network (PSTN) lines, was not developed for sophisticated speech-optimized transmission channels.

For various reasons, text telephone transmission methods using the speech path are desired in view of text telephony being acknowledged as a way to make contact for emergency services. Emergency services in wireless telephones are so far only defined for speech calls. Alternating speech and text in a call is desired. A simple way to accomplish this goal without special service support (like multimedia) is alternating use of the speech channel for speech and text.

FIG. 1 illustrates FIG. 1 of the 3GPP Technical Specification TS 26.226 v5.0.0 (2001-03) which is incorporated herein by reference in its entirety. An overall architecture is illustrated for supporting text telephone and speech communications via cellular telephone.

The cellular text telephone (CTM) adaptor 32, including a transmitter and receiver, supports text and voice communications using speech encoding in cellular telephone systems. The CTM adaptor may be used with the practice of the present invention in a preferred embodiment thereof as described below.

The system of FIG. 1 includes a mobile subscriber terminal 10 which includes both an input 12 and an output 14 for speech which are respectively utilized for transmitting and receiving speech. Text telephone 16 provides text which is selectively transmitted after the closing of switch 18. Element 20 includes a text telephone detector 22 which receives an input of either text from the text telephone 16 or speech from the speech input 14. If text is detected by the text telephone detector, switch S3 is opened, causing the output of text by the text telephone detector. On the other hand, if the text telephone detector 22 does not detect text, switch S3 is closed by the text telephone detector which bypasses the text telephone detector to prevent outputting of text. A CTM transmitter 24 processes the input of text into an output CTM signal which is encoded with coding chosen to not introduce unacceptably high CER during subsequent encoding by the speech encoder 26. The combination of the CTM transmitter 24 and speech encoder 26 provide for a robust transmission of textual information over the speech channel 28 without the problems that characterize the prior art. If speech input 12 is providing sound-based information, switch S1 is closed by the CTM transmitter 24 so that speech totally bypasses the text telephone detector 22 and the CTM transmitter 24 and is added to the output of the CTM transmitter 24 and input to the speech encoder 26 by adder 30. It is therefore seen that the CTM adapter 32 when transmitting either speech or text modulates the output with a traditional speech encoder 26.

The transmitted speech encoded signal is transmitted over an air interface using encoding produced, for example, by an AMR speech coder, to a network part 34 which may be a media gateway or transcoding equipment. A speech decoder processes the encoded transmission on the speech channel and provides a PCM encoded input thereof to the CTM receiver 38 of a CTM adapter 32. The CTM receiver 38 detects whether or not text is transmitted. When text is detected by the CTM receiver 38, switch S2 is opened causing the output of text from the CTM receiver 38 to be input to a text telephone regenerator 42 which regenerates the input of text from the CTM receiver 38 into a form reproducible by text telephone 44. Text telephone 44 may be part of any network 46, including the mobile network in which text telephone 16 is resident providing text telephone support thereof. If the output from the speech decoder 36 is not detected by the CTM receiver 38 as being text, switch S2 is closed by the CTM receiver 38 and similarly, switch S4 is closed by the text telephone regenerator 42 resulting in speech being input by adder 48 into the network 46. Assuming that text is transmitted, the text is reproduced by text telephone 44 in the well-known manner. If speech is present, speech is outputted to the user by a speaker or other element (not illustrated).

The operation of the system of FIG. 1 for the reception of speech or text originated by the telephone connected to the network 46 is the reverse of the above process. The same elements are used to encode and decode the transmission of text or speech in speech encoded form in a reverse direction but in the same manner as described above during the delivery of text or speech to the mobile terminal 10.

The architecture of the CTM transmitter 24 and the CTM receiver 38 is described in the aforementioned TS 26.226 beginning in Section 8 thereof and therefore is not described in detail herein.

CTM works well between telephone users. However, the CTM standard does not describe a mechanism by which messages which are conventionally transmitted by telephone networks in a non-text form, such as voice, tone, or sound, are alternatively transmitted as text messages to users of text telephones. Therefore, while the prior art has a mechanism for transmitting textual messages to telephone users, there is no current mechanism which permits a message which is sent traditionally by a network in non-textual form to users of ordinary telephones to be selectively encodable as a textual message which is speech encoded and transmitted over a speech channel to users of text telephones so as to enable those users to be notified of the content of the traditional sound-based messages originating from a telephone network via textual format.

SUMMARY OF THE INVENTION

The present invention is a system, a method of transmitting messages selectively as text or non-text from an entity in a network which provides the messages to at least one terminal and the entity in the network which provides the messages to the at least one terminal. In accordance with the invention, an entity in a network, which provides messages selectively as encoded as text or in non-text form to the network, encodes the text messages in a speech encoded form. In a preferred embodiment, the invention utilizes the prior art's CTM adaptor, as described above, in the network entity selectively which provides a message in either an encoded form text by the CTM transmitter or non-text format to a speech encoder which transmits the message in speech encoded form to a text telephone terminal. The text telephone produces the message as an encoded text message or a sound-based message depending upon whether the message was generated as a text message or a non-text message. It is therefore seen that the present invention processes messages generated at the network entity as either encoded text or a non-text which contain the same information and transmits those messages in a speech encoded form over a speech transmission path or channel to a text telephone for reproduction as either text or non-text.

While a preferred embodiment of the present invention uses a CTM adapter of the prior art, it is within the scope of the invention to utilize any transmitter/encoder which formats the text into an encoded form permitting subsequent speech encoding of non-text and encoded text, e.g. PCM, with acceptable sound quality and an acceptable CER.

The present invention may be used within a single network for the transmission selectively of text or non-text messages to a terminal or between networks in which the text or non-text messages are transmitted from a first network, e.g. a home network to a second network, e.g. a visited network which contains the at least one text terminal which may be mobile.

With the invention, traditional voice, sound or tone-based network services, such as announcements, warning tones, dialing tones, etc. for users of text telephones may be generated into equivalent textual messages or sent in traditional non-text form. Each network message for text or non-text delivery must be stored in a selectable form. When a service is requested for a text telephone user, the text-based form of the aforementioned traditional messages is fetched from storage and fed to the transmitter/encoder which encodes the text message in a form which may be subsequently speech encoded and transmitted without substantial CER. Preferably the selected text message is fed to the CTM transmitter part of the CTM adapter of the prior art. The resultant CTM signal encoding the text message is then encoded as a normal speech encoded signal by a speech encoder and processed as a normal speech signal in subsequent network elements. The nature of the transmission determines the type of encoding that is used. In the circumstance where the non-text based form of the traditional messages is chosen, the non-text encoded form of the traditional message is transmitted as a normal speech encoded signal.

One implementation of the invention may be with an announcement service located in a media gateway. Each announcement, which is generated by the network, is stored both as a speech signal and as an equivalent textual format. Depending on the nature of the service request from either the text telephone user or otherwise, such as from network stored intelligence which may be obtained from a network register, such as a home location register (HLR) or a visiting location register (VLR) in a cellular network, the announcement is either encoded in the normal manner as a speech signal and transmitted to the at least one terminal for reproduction as a sound signal or as encoded text so that the subsequent encoding as a speech a signal produces a signal with acceptable CER which is transmitted to the subscriber. The selection of a transmission form of a message by a subscriber typically controls the format of the message, e.g. text or non-text, being determined by the nature of the telephone which the subscriber has, e.g. a text telephone or a normal telephone. However, in accordance with the invention, a text telephone may receive mixed messages of both text and sound depending upon circumstances, including service requirements of the subscriber.

In a preferred embodiment utilizing the CTM adapter including a CTM transmitter, the CTM adapter may be included in a media gateway to provide basic TTY service for receiving text messages, which are not generated by the network entity, while the same CTM transmitter is utilized for transmitting other textual messages generated by the network entity of the present invention.

In accordance with the invention, several methodologies may be utilized in deciding the form of a message which is to be transmitted to a subscriber, e.g. text based form or speech based form. One mechanism is to use a storage in a network, which may in a home network, a visited network or in another network, such as a HLR of a home network or a VLR of a visited network which is modified to include a specification of whether or not the subscriber is a text telephone subscriber. This information could be read from the network storage and used to determine when a particular subscriber is to be sent a network message and the form of the message, e.g., text or non-text. Alternatively, in a preferred embodiment where CTM transmission and reception is utilized, a CTM negotiation may be used to determine a trigger for deciding when to provide text based messages in accordance with TS 26.226 which is incorporated herein by reference in its entirety. Bearer Capability IE as specified by TS 24.008, which is incorporated herein by reference in its entirety, may be used to determine whether the terminal supports text telephony. If there was no textual telephony support there would be no basis for sending text messages. The use of the CTM negotiation provides advantages in that terminals which initiate a CTM negotiation have a very high probability of requiring the actual transmission of network originated textual messages.

A system in accordance with the invention includes at least one terminal; a network containing the at least one terminal; an entity in the network which provides messages selectively as text or non-text to the network in a speech encoded form; and wherein the messages are transmitted in the speech encoded form by the network to the at least one terminal which reproduces the messages to a user thereof in either a text form or by a sound reproduction device of the at least one terminal. The network entity may use a cellular text telephone modem (CTM) to encode the text messages. The non-text messages may be voice, tones or sound. The at least one terminal may be mobile and the network may be a wireless network or the at least one terminal may be in a wireline network. The terminal may be a text telephone (TTY) terminal; and the encoded messages may be transmitted to the terminal using a speech channel. A determination of whether the network entity is to provide the messages as text messages may be obtained from information stored in the network. The information stored in the network may be in a home location register of a user of the at least one terminal or in a visiting location register of a user of the at least one terminal. Providing of messages as text to the at least one terminal may occur after a CTM negotiation has been completed by the at least one mobile terminal. Providing of messages as text may occur to the at least one terminal after bearer capability has been used to determine that the at least one terminal is to receive text messages.

A method of transmitting messages selectively as text or non-text from an entity in a network which provides the messages to at least one terminal in the network in accordance with the invention includes providing the messages selectively as text or non-text in a speech encoded form from the entity to the network; and transmitting the messages in the speech encoded from by the network to the at least one terminal which reproduces the messages to a user thereof in either a text form or by a sound reproduction device of the at least one terminal. The network entity may use a cellular text telephone modem (CTM) to encode the text messages. The non-text messages may comprise voice, tones, or sound. The at least one terminal may be mobile and the network may be a wireless network or the at least one terminal may be in a wire line network. The terminal may be a text telephone (TTY) terminal; and the speech encoded messages may be transmitted to the terminal using a speech channel. A determination of whether the network entity is to provide the messages as text messages may be obtained from information stored in the network. The information stored in the network may be from a home location register if the user is in a home network or from a visiting location register if a user of the at least one terminal is in a visiting element. Providing of messages as text to the at least one terminal may occur after a CTM negotiation has been completed by the at least one terminal which may be a mobile terminal if the network in which the terminal is located is a wireless terminal. Providing of messages as text to the at least one terminal may be after bearer capability has been used to determine that the at least one terminal receives text messages.

In a system including at least one terminal in a network, an entity in the network in accordance with the invention includes a source of messages which selectively may be chosen to be transmitted to the at least one terminal as text or non-text; and a modulator which encodes the text messages; a speech encoder which encodes the text messages and the non-text messages in a speech encoded form which are transmitted to the network; and wherein the messages are transmitted in the speech encoded form by the network to the at least one terminal which reproduces the messages to the user thereof in either a text form or by a sound reproduction device of the at least one terminal. The modulator may be a cellular text telephone modem (CTM) which encodes text messages. The non-text messages may comprise voice, tones, or sound. The at least one terminal may be mobile and the network may be a wireless network or the at least one terminal may be in a wire line network. A determination of whether the network entity is to provide the messages as text messages may be obtained from information stored in the network. The information stored in the network may be in a home location register of a user of the at least one terminal or the information stored in the network is in a visiting location register of a user of the network. Providing of messages as text to the at least one terminal may occur after a CTM negotiation has been completed by the at least one mobile terminal. Providing of messages as text to the at least one terminal may occur after bearer capability has been used to determine that the at least one terminal receives text messages.

BRIEF DESCRIPTION OF THE DRAWINGS

Like reference numerals identify like parts throughout the drawings.

DESCRIPTION OF THE PREFERRED EMBODIMENTS

Figure 2:
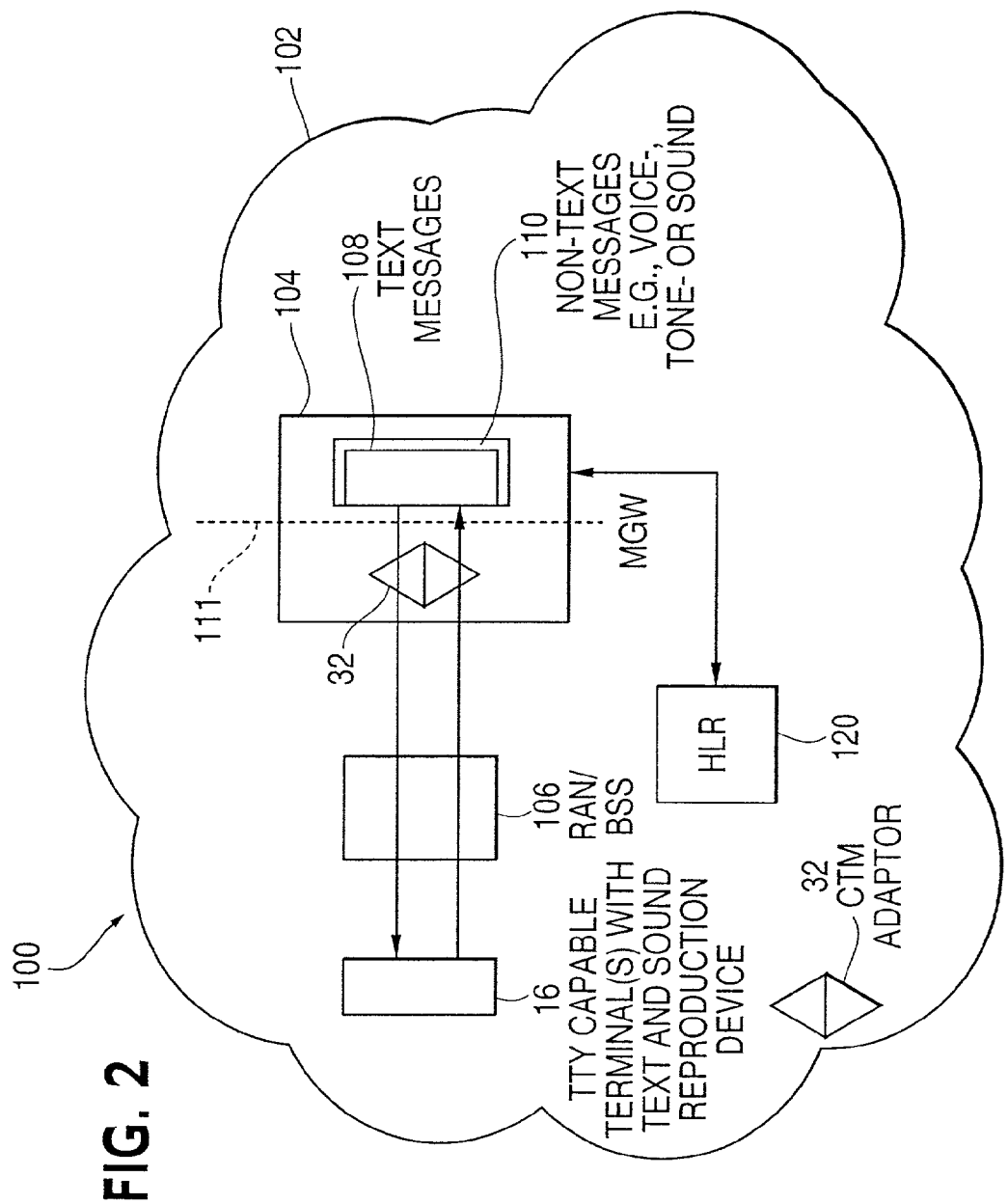
FIG. 2 illustrates a first embodiment of the present invention.

FIG. 2 illustrates a first embodiment 100 in accordance with the present invention. In the first embodiment, at least one text telephone (TTY) 16 is located in a network 102. Network entity 104 selectively originates messages of substantive identical or substantially identical content stored in either text or non-text. Alternatively, the messages may be unrelated in that special purpose text messages may be stored which do not have a non-text stored counterpart. The embodiment 100 uses the CTM adapter 32 of the prior art, in response to the feed of a text or non-text message, to output either a speech signal or a text message encoded as CTM signal to a speech encoder (not illustrated). The speech encoded signal produced by the speech encoder is transmitted from the entity 104 to a radio access network/base station system (BSS) 106 which is well known in wireless applications.

Figure 1:
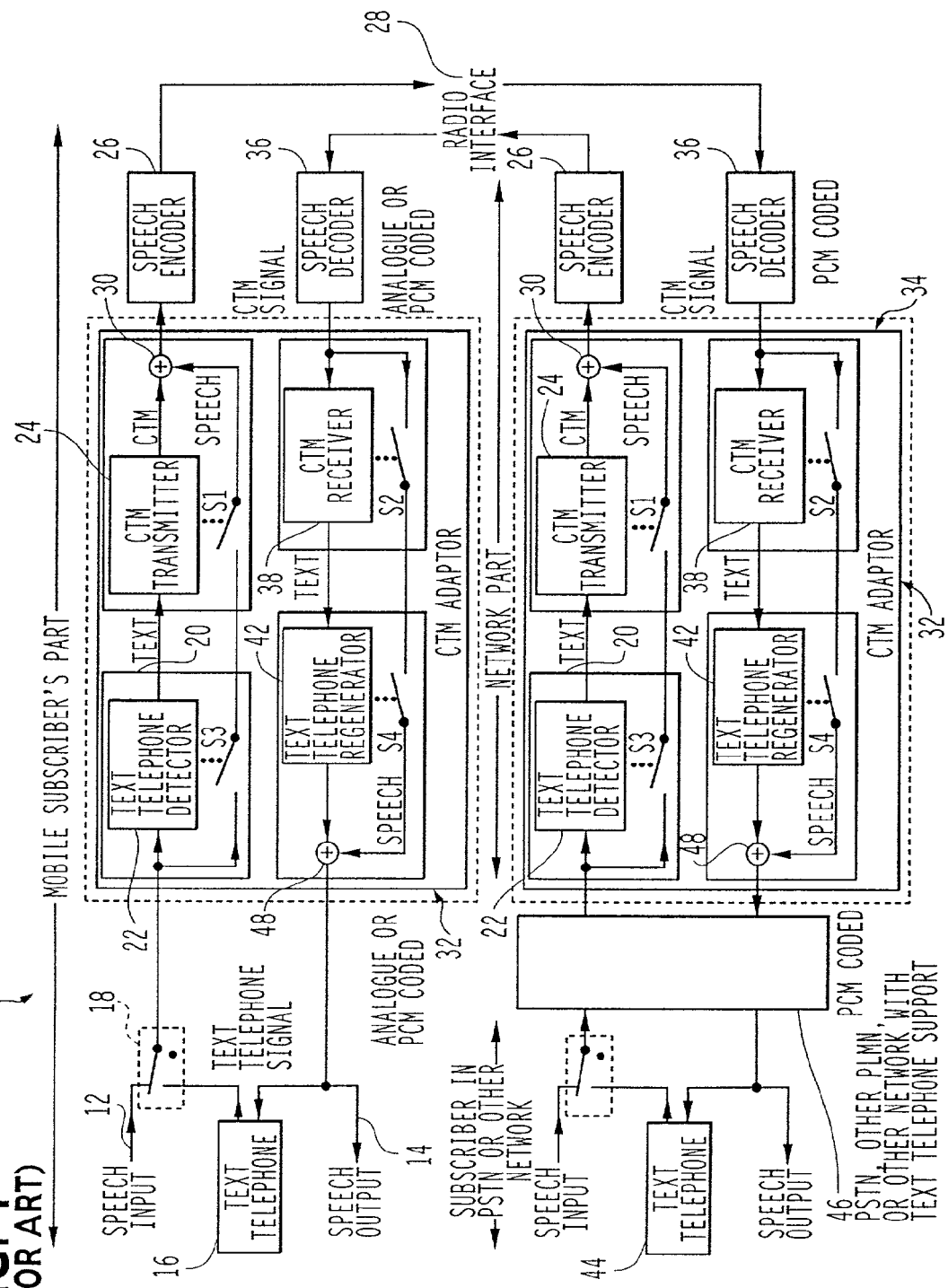
FIG. 1 illustrates a prior art diagram of a system for transmitting speech and text telephony using speech encoding.

The text messages which are sent from the entity 104 to the text telephone 16 are stored in a text messages storage 108 and the non-text messages, which typically are the equivalent in content of the text messages, are stored in the non-text messages storage 110. The stored messages are provided selectively to the CTM adapter 32 in a manner analogous to the inputting of messages in the prior art from the text telephone 16 of FIG. 1. After processing by the CTM adapter 32, which outputs the text messages as a CTM signal and non-text messages, speech encoding of the text and non-text messages occurs. The RAN/BSS 106 transmits the speech encoded signal, containing either the text or the non-text messages, to the text telephone 16 where reproduction in the well-known manner to output either text or the equivalent non-text messages by a sound reproduction device occurs.

The determination of whether a message is to be sent in a text or non-text based form from the entity 104 to a text telephone 16 may be determined in different ways. One example for determining whether a message should be sent in encoded text form or non-text is by fetching stored subscriber information identifying if the subscriber has a text telephone and under what conditions use is to be made from storing subscriber information regarding services to be rendered to the user of the text telephone 16. The prior art usage of a HLR 120 is modified to include subscriber information regarding subscription to text telephone services. In the illustrated embodiment, the entity 104 may decide whether any network generated message is to be sent and further if a network generated message is to be sent, whether it is to be encoded in text form or non-text by obtaining stored information from the HLR 120 regarding the subscriber of the text telephone 16. Another alternative is to use a CTM adapter 32 in both the network entity 104 and in the text telephone 16 which permits before any CTM transmission can occur that a CTM availability negotiation be performed in accordance with TS 26.226. The network entity 104 may use the CTM availability negotiation as a trigger for deciding when to provide text based message with the understanding that if the negotiation is successful between the CTM adapter of the text telephone 16 and the network entity 104, that necessarily text services for network generated messages are desired. Another alternative, also based upon CTM availability, is to use the Bearer Capability IE specified in Technical Specification TS 24.008 which is used to determine if the text telephone 16 supports text telephony (TTY). The use of the CTM negotiation is efficient since a high probability exists that a user of the text telephone 16 negotiating CTM ability requires a text message transmission.

Figure 3:
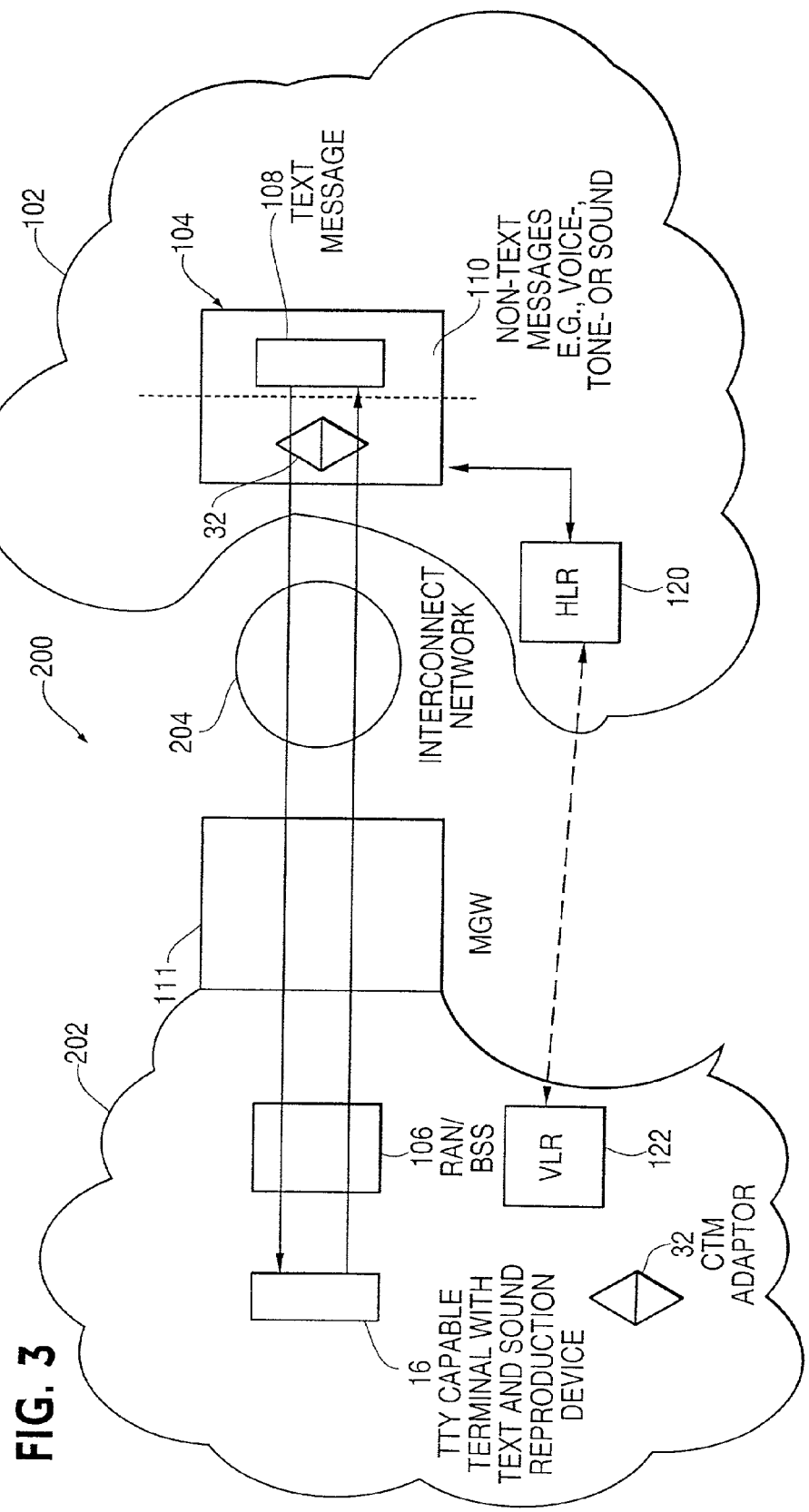
FIG. 3 illustrates a second embodiment of the present invention.

FIG. 3 illustrates a second embodiment 200 which functions in a different network environment but in the same manner as the embodiment 100 of FIG. 2. The embodiment of FIG. 3 includes a home network 102 and a visited network 202 in which the RAN/BSS 106 and text telephone 16 are located. The media gateway 111, which receives information generated by the network entity 104, is coupled to the visited network 202. The two networks are connected by an interconnect network 204, but it should be understood that the way in which connection of multiple networks is achieved is not part of the invention. In the embodiment 200, the VLR 122 of the visited network 202 or the HLR 120 may be used to store subscriber information used to determine whether or not the user of the at least one text telephone 16 is to receive no messages at all, text messages or the equivalent non-text messages. The overall operation of the embodiment of FIG. 2, including the conditions for determining whether text messages should or should not be used for the at least one terminal 16 is identical to the mechanisms described above with respect to FIG. 1.

It is desirable for terminals in accordance with the invention to start CTM negotiation as early as possible to enable network text services. In the prior art CTM terminals start CTM availability negotiation only when text is to be transmitted. To provide for effective and efficient network text services, the terminals need to start the CTM negotiation availability as soon as a traffic channel has been allocated. This permits the network to provide text for network services, such as a busy tone, which happens very quickly.

While the invention has been described in terms of its application to mobile networks, it should be understood that the present invention is also equally applicable to wire line networks. In a wireline application, corresponding wire line network elements would be used in place of the wireless elements illustrated in embodiments 100 and 200.

While the invention has been described in terms of its preferred embodiments, it should be understood that numerous modifications may be made thereto without departing from the spirit and scope of the present invention. It is intended that all such modifications fall within the scope of the appended claims.

The invention claimed is:

1. A system comprising:
   at least one terminal;
   a network containing the at least one terminal;
   an entity in the network which provides messages, each message being selectively transmitted as text or non-text to the network in a speech encoded form; and wherein
   the messages are transmitted in the speech encoded form by the network to the at least one terminal which reproduces the messages to a user thereof in either a text form or by a sound reproduction device of the at least one terminal.

2. A system in accordance with claim 1 wherein:
   the messages are transmitted in the speech encoded form using a speech transmission path.

3. A system in accordance with claim 2 wherein:
   the network entity uses a cellular text telephone modem (CTM) to encode the text messages.

4. A system in accordance with claim 3 wherein:
   the at least one terminal is mobile and the network is a wireless network.

5. A system in accordance with claim 2 wherein the non-text messages comprise:
   voice.

6. A system in accordance with claim 5 wherein:
   the at least one terminal is mobile and the network is a wireless network.

7. A system in accordance with claim 2 wherein the non-text messages comprise:
   tones.

8. A system in accordance with claim 7 wherein:
   the at least one terminal is mobile and the network is a wireless network.

9. A system in accordance with claim 2 wherein the non-text messages comprise:
   sound.

10. A system in accordance with claim 9 wherein:
    the at least one terminal is mobile and the network is a wireless network.

11. A system in accordance with claim 2 wherein:
    the at least one terminal is mobile and the network is a wireless network.

12. A system in accordance with claim 11 wherein:
    a determination of whether the network entity is to provide the messages as text messages is obtained from information stored in the network.

13. A system in accordance with claim 12 wherein:
    the information stored in the network is in a home location register of a user of the at least one terminal.

14. A system in accordance with claim 12 wherein:
    the information stored in the network is in a visiting location register of a user of the at least one terminal.

15. A system in accordance with claim 2 wherein:
    the at least one terminal is in a wireline network.

16. A system in accordance with claim 15 wherein:
    a determination of whether the network entity is to provide the messages as text messages is obtained from information stored in the network.

17. A system in accordance with claim 16 wherein:
    the information stored in the network is in a home location register of a user of the at least one terminal.

18. A system in accordance with claim 16 wherein:
    the information stored in the network is in a visiting location register of a user of the at least one terminal.

19. A system in accordance with claim 2 wherein:
    the terminal is a text telephone (TTY) terminal; and
    the encoded messages are transmitted to the terminal using a speech channel.

20. A system in accordance with claim 2 wherein:
    providing of messages as text to the at least one terminal occurs after a CTM negotiation has been completed by the at least one mobile terminal.

9

21. A system in accordance with claim 2 wherein:
providing of messages as text occurs to the at least one terminal occurs after bearer capability has been used to determine that the at least one terminal is to receive text messages.

22. A method of transmitting messages, each
message being selectively transmitted as text or non-text from an entity in a network which provides each messages to at least one terminal in the network comprising:
providing the messages, each message being selectively transmitted as text or non-text in a speech encoded form from the entity to the network; and
transmitting the messages in the speech encoded from by the network to the at least one terminal which reproduces the messages to a user thereof in either a text form or by a sound reproduction device of the at least one terminal.

23. A method in accordance with claim 22 wherein:
the messages are transmitted in the speech encoded form using a speech transmission path.

24. A method in accordance with claim 23 wherein:
the network entity uses a cellular text telephone modem (CTM) to encode the text messages.

25. A method in accordance with claim 24 wherein:
the at least one terminal is mobile and the network is a wireless network.

26. A method as in claim 23 wherein:
the non-text messages comprise voice.

27. A method in accordance with claim 26 wherein:
the at least one terminal is mobile and the network is a wireless network.

28. A method as in claim 23 wherein:
the non-text messages comprise tones.

29. A method in accordance with claim 28 wherein:
the at least one terminal is mobile and the network is a wireless network.

30. A method as in claim 23 wherein:
the non-text messages comprise sound.

31. A method in accordance with claim 30 wherein:
the at least one terminal is mobile and the network is a wireless network.

32. A method in accordance with claim 23 wherein:
the at least one terminal is mobile and the network is a wireless network.

33. A method in accordance with claim 32 wherein:
a determination of whether the network entity is to provide the messages as text messages is obtained from information stored in the network.

34. A method in accordance with claim 33 wherein:
the information stored in the network is in a home location register of a user of the at least one terminal.

35. A method in accordance with claim 33 wherein:
the information stored in the network is in a visiting location register of a user of the at least one terminal.

36. A method in accordance with claim 23 wherein:
the at least one terminal is in a wireline network.

37. A method in accordance with claim 36 wherein:
a determination of whether the network entity is to provide the messages as text messages is obtained from information stored in the network.

38. A method in accordance with claim 37 wherein:
the information stored in the network is in a home location register of a user of the at least one terminal.

39. A method in accordance with claim 37 wherein:
the information stored in the network is in a visiting location register of a user of the at least one terminal.

10

40. A method in accordance with claim 23 wherein:
the terminal is a text telephone (TTY) terminal; and
the speech encoded messages are transmitted to the terminal using a speech channel.

41. A method in accordance with claim 23 wherein:
providing of messages as text occurs to the at least one terminal occurs after a CTM negotiation has been completed by the at least one mobile terminal.

42. A method in accordance with claim 23 wherein:
providing of messages as text to the at least one terminal occurs after bearer capability has been used to determine that the at least one terminal receives text messages.

43. In a system including at least one terminal in a network, an entity in the network comprising:
a source of messages, each message being selectively transmitted to the at least one terminal as a text message or a non-text message;
a modulator, coupled to the source of messages, which encodes the text messages;
a speech encoder coupled to the non-text messages from the source of messages and to the non-text messages provided by the modulator which encodes the text messages and the non-text messages in a speech encoded form which are transmitted to the network; and wherein
the messages are transmitted in the speech encoded form by the network to the at least one terminal which reproduces the messages to the user thereof in either a text form or by a sound reproduction device of the at least one terminal.

44. An entity in accordance with claim 43 wherein:
the messages are transmitted in the speech encoded form using a speech transmission path.

45. An entity in accordance with claim 44 wherein:
the modulator is a cellular text telephone modem (CTM) which encodes text messages.

46. An entity in accordance with claim 44 wherein:
the non-text messages comprise voice.

47. An entity in accordance with claim 46 wherein:
the at least one terminal is mobile and the network is a wireless network.

48. An entity in accordance with claim 44 wherein:
the non-text messages comprise tones.

49. An entity in accordance with claim 48 wherein:
the at least one terminal is mobile and the network is a wireless network.

50. An entity in accordance with claim 44 wherein:
the non-text messages comprise sound.

51. An entity in accordance with claim 50 wherein:
the at least one terminal is mobile and the network is a wireless network.

52. An entity in accordance with claim 44 wherein:
the at least one terminal is mobile and the network is a wireless network.

53. An entity in accordance with claim 52 wherein:
a determination of whether the network entity is to provide the messages as text messages is obtained from information stored in the network.

54. An entity in accordance with claim 53 wherein:
the information stored in the network is in a home location register of a user of the at least one terminal.

55. An entity in accordance with claim 53 wherein:
the information stored in the network is in a visiting location register of a user of the network.

56. An entity in accordance with claim 45 wherein:

the at least one terminal is mobile and the network is a wireless network.

57. An entity in accordance with claim 44 wherein:

the at least one terminal is in a wireline network.

58. An entity in accordance with claim 57 wherein:

a determination of whether the network entity is to provide the messages as text messages is obtained from information stored in the network.

59. An entity in accordance with claim 58 wherein:

the information stored in the network is in a home location register of a user of the at least one terminal.

60. An entity in accordance with claim 58 wherein:

the information stored in the network is in a visiting location register of a user of the network.

61. An entity in accordance with claim 43 wherein:

providing of messages as text to the at least one terminal occurs after a CTM negotiation has been completed by the at least one mobile terminal.

62. An entity in accordance with claim 43 wherein:

providing of messages as text to the at least one terminal occurs after bearer capability has been used to determine that the at least one terminal receives text messages.

* * * * *